United States Patent
Wu

(10) Patent No.: US 10,325,463 B2
(45) Date of Patent: Jun. 18, 2019

(54) SYSTEMS AND METHODS FOR CHANGING AN OPERATION OF A SECURITY SYSTEM IN RESPONSE TO COMPARING A FIRST UNIQUE IDENTIFIER AND A SECOND UNIQUE IDENTIFIER

(71) Applicant: Honeywell International Inc., Morristown, NJ (US)

(72) Inventor: Yue Wu, Shanghai (CN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/807,845

(22) Filed: Nov. 9, 2017

(65) Prior Publication Data

US 2019/0139384 A1 May 9, 2019

(51) Int. Cl.
*G08B 13/22* (2006.01)
*G06K 19/06* (2006.01)
*G08B 25/00* (2006.01)
*G06Q 10/08* (2012.01)

(52) U.S. Cl.
CPC ........ *G08B 13/22* (2013.01); *G06K 19/06028* (2013.01); *G06K 19/06037* (2013.01); *G06Q 10/083* (2013.01); *G08B 25/008* (2013.01)

(58) Field of Classification Search
CPC ....................................... G08B 13/22
USPC ......................................... 340/541
See application file for complete search history.

(56) References Cited

U.S. PATENT DOCUMENTS

| | | | |
|---|---|---|---|
| 7,382,405 B2 * | 6/2008 | Kusaka | H04N 1/00281 348/231.6 |
| 9,626,814 B2 * | 4/2017 | Eyring | G07C 9/00031 |
| 2003/0040932 A1 * | 2/2003 | Sato | G07C 9/00031 340/541 |
| 2010/0052902 A1 * | 3/2010 | Wu | G08B 13/19 340/541 |
| 2015/0120596 A1 | 4/2015 | Fadell et al. | |
| 2015/0235536 A1 * | 8/2015 | Libal | G08B 13/22 340/541 |
| 2016/0171435 A1 * | 6/2016 | Newton | G06Q 10/0833 705/333 |
| 2017/0236193 A1 | 8/2017 | Zundel et al. | |
| 2018/0075681 A1 * | 3/2018 | Scalisi | G06Q 10/0833 |
| 2018/0144286 A1 * | 5/2018 | Shucker | G06Q 10/083 |

FOREIGN PATENT DOCUMENTS

WO    WO 00/57759    10/2000

OTHER PUBLICATIONS

Extended European search report for corresponding EP patent application 18195572.5, dated Feb. 4, 2019.

* cited by examiner

*Primary Examiner* — Qutbuddin Ghulamali
(74) *Attorney, Agent, or Firm* — Husch Blackwell LLP

(57) ABSTRACT

Systems and methods are provided for altering an operation characteristic of a security system based on comparing a first representation of a first unique identifier to a second representation of a second unique identifier. Some methods can include a control panel transitioning the security system from a current state to a new state or displaying an alert message.

20 Claims, 3 Drawing Sheets

SYSTEMS AND METHODS FOR CHANGING AN OPERATION OF A SECURITY SYSTEM IN RESPONSE TO COMPARING A FIRST UNIQUE IDENTIFIER AND A SECOND UNIQUE IDENTIFIER

FIELD

The present invention relates generally to security systems. More particularly, the present invention relates to systems and methods for matching a first unique identifier received in response to an online order with a second unique identifier and changing an operation of a security system based on a comparison of the first unique identifier and the second unique identifier.

BACKGROUND

Known security systems do not have a convenient and secure way to verify the identity of a delivery man and change the underlying operations of the security system depending on such verification. For example, criminals have been known to pose as delivery men to gain access to a home, which can result in an unsafe environment.

In view of the above, there is a continuing, ongoing need for improved systems and methods.

DETAILED DESCRIPTION

Figure 1:
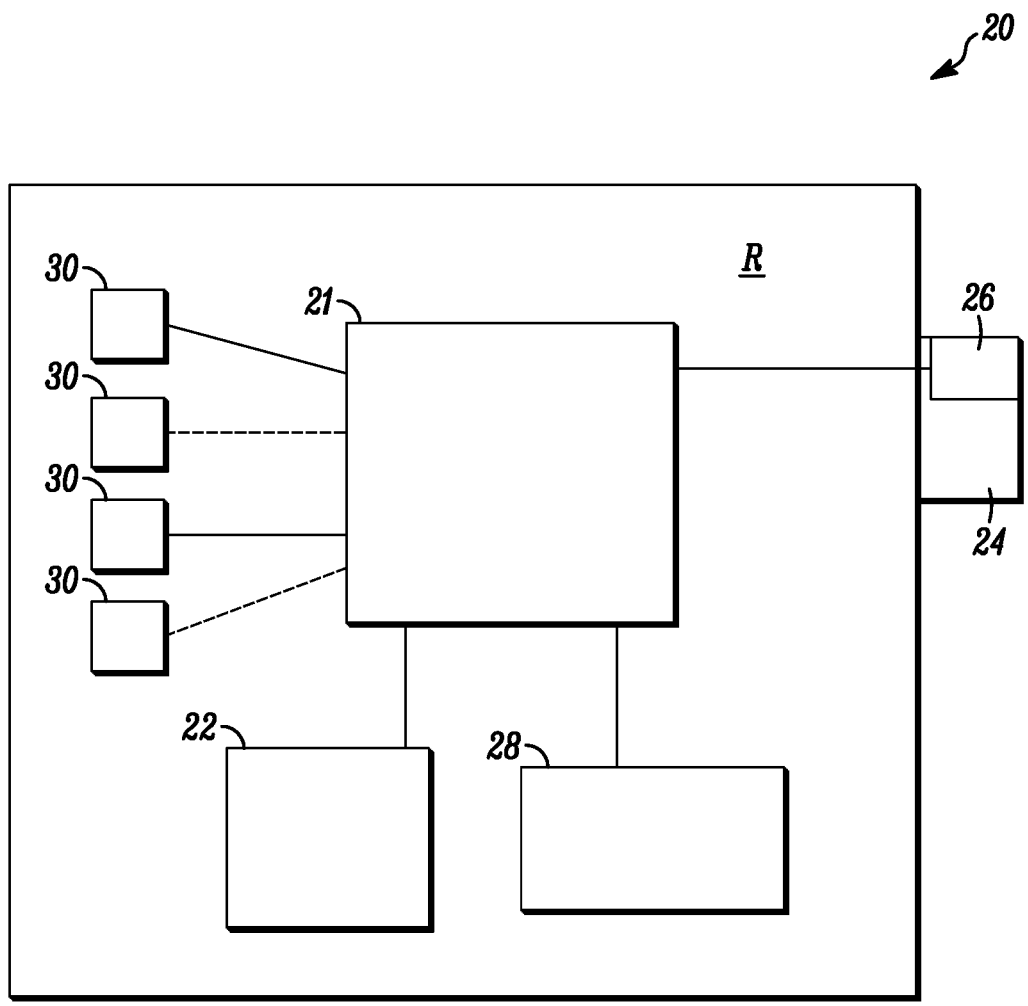
FIG. 1 is a block diagram of a security system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for changing an operation of a security system in response to comparing a first unique identifier and a second unique identifier. For example, systems and methods disclosed herein can include a control panel of a security system that can compare a representation of a first unique identifier to a representation of a second unique identifier received from an external sensor and change an operation of the security system based on the results of the comparison.

Systems and methods disclosed herein are described in connection with a security system. It is to be understood that such systems can include, but are not limited to a home automation system or any other systems that include a control panel in communication with a plurality of sensors for detecting an alarm condition in a region.

In accordance with disclosed embodiments, an internet connected device (e.g. a computer, a smartphone, a tablet, etc.) can place an online order using an online platform for a retailer that requires delivery to a region protected by a security system connected to the internet connected device. The internet connected device may receive a digital representation of a first unique identifier (e.g. a bar code, QR code, etc.) associated with the online order from the retailer. The internet connected device may forward the digital representation of the first unique identifier to a control panel of the security system that protects the region. In some embodiments, the control panel may associate the digital representation of the first unique identifier with a predetermined state of the security system, such as a safe state.

In accordance with disclosed embodiments, an exterior sensor coupled to the control panel of the security system may scan a second unique identifier (e.g. bar code, QR code, etc.) and forward a digital representation of the second unique identifier to the control panel. In some embodiments, the sensor may be integrated with an exterior intercom or keypad of the security system. The second unique identifier may be affixed to a package associated with the online order.

In some embodiments, the control panel may compare the digital representation of the second unique identifier to the digital representation of the first unique identifier and adjust an operation of the security system based on whether the two representations match. For example, the control panel may display a recognition symbol on a display device coupled to the control panel so as to indicate that a deliveryman delivering the package containing the second unique identifier is legitimate when the two representations match. As another example, the control panel may initiate an alarm condition for the security system when the two representations do not match. The alarm condition may include, but is not limited to a flashing warning on the display device of the control panel, an audible alarm sound, a message to a handheld device connected to the security system, or a message to a third party monitoring service. The alarm condition may be used to alert a user of the security system that the deliveryman delivering the package containing the second unique identifier is not legitimate.

In some embodiments, the control panel may alter a state of the security system based on whether the two representations match. For example, the control panel may transition the security system from a current state to a new state. Where the two representations match and the current state is an armed state, the control panel may transition to the safe state previously associated with the first unique identifier. Where the two representations match and the current state is a disarmed state, the control panel may transition to the safe state previously associated with the first unique identifier. In some embodiments, the disarmed state and the safe state can be the same, and the control panel may maintain the safe state when the two representations match. Where the two representations do not match and the current state is the armed state, the control panel may transition to or maintain the armed state. Where the two representations do not match and the current state is the disarmed armed state, the control panel may transition to the armed state.

FIG. 1 is a block diagram of a system in accordance with disclosed embodiments. As shown in FIG. 1, the system 20 (e.g. home automation system, security system, etc.) may be deployed within a region R and may include a control panel 21, an internet connected device 22 (e.g. computer, tablet mobile phone, etc.), an external interface device 24 carrying an external sensor 26, a display device 28, and a plurality or wired or wireless sensors 30.

In some embodiments, the control panel 21 may be coupled to the internet connected device 22, the display device 28, and the external sensor 26 through respective wired or wireless communication paths. The external interface device 24 may be used to verify the identity of a visitor to the region R and may include an intercom device, a keypad, or a video camera. The external sensor 26 may be embedded or housed within the external interface device 24 and may include an optical scan sensor, a laser light sensor, or an infra-red sensor. The display device 28 may be separate or integrated with the control panel 21. The plurality of wired or wireless sensors 30 may be alarm sensors used to trigger alarms in conjunction with the control panel 21 or monitoring devices used to indicate a state of the region R.

In accordance with disclosed embodiments, the internet connected device 22 may access an online website, dedicated platform, or application and place an order or make a purchase that requires delivery to the region R. Once the order is placed, the internet connected device 22 may receive a first representation of a first unique identifier from the online website, dedicated platform, or application and forward the first representation to the control panel 21. The first representation may include information about the order or a unique string of numbers and letters that can identify the order. The first unique identifier may include a bar code or QR code that, when read with a scanner, reproduces the information about the order or the unique string of numbers and letters embodied in the first representation. In some embodiments, the control panel may associate the first representation with a predetermined state of the security system 20, such as a safe state.

In accordance with disclosed embodiments, the external sensor 26 may scan a second unique identifier, decode a second representation of the second unique identifier, and forward the second representation to the control panel 21. The second unique identifier may be a QR code or bar code affixed to the outside of a package being delivered by a deliveryman to the region R. The second representation may include information about the package or a unique string of numbers and letters that can identify the package being delivered. The control panel 21 may receive the second representation and compare the second representation with the first representation to determine whether the second representation matches the first representation. In some embodiments, the control panel may compare the second representation with a list of representations stored in a memory or a database connected to the control panel 21 in order to determine whether any of the list of representations matches the second representation. The control panel 21 may alter one or more operational characteristics of the security system 20 based on whether the first representation matches the second representation. As disclosed herein, the operational characteristics may include transitioning the security system from a current state to a new state or displaying an alarm indicator on the display device 28.

Figure 2:
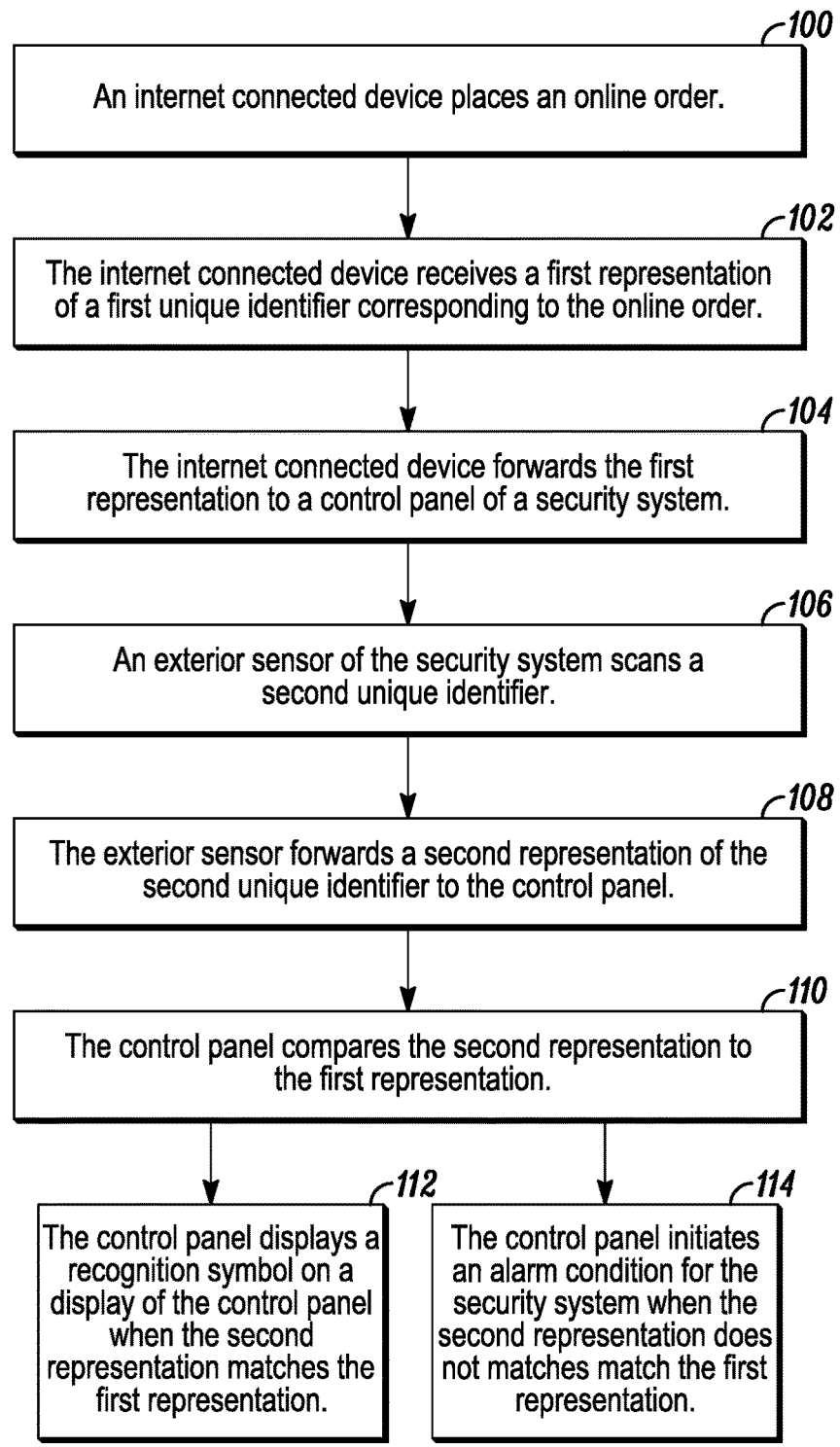
FIG. 2 is a flow diagram of a method in accordance with disclosed embodiments.

FIG. 2 is a flow diagram of a method in accordance with disclosed embodiments. As seen, an internet connected device can place an online order as in 100. The internet connected device can receive a first representation of a first unique identifier corresponding to the online order as in 102. The internet connected device can forward the first representation to a control panel of a security system as in 104. An exterior sensor of the security system can scan a second unique identifier as in 106. The exterior sensor can forward a second representation of the second unique identifier to the control panel as in 108. The control panel can compare the second representation to the first representation as in 110. The control panel can display a recognition symbol on a display device of the control panel when the second representation matches the first representation as in 112. The control panel can initiate an alarm condition for the security system when the second representation does not match the first representation as in 114.

Figure 3:
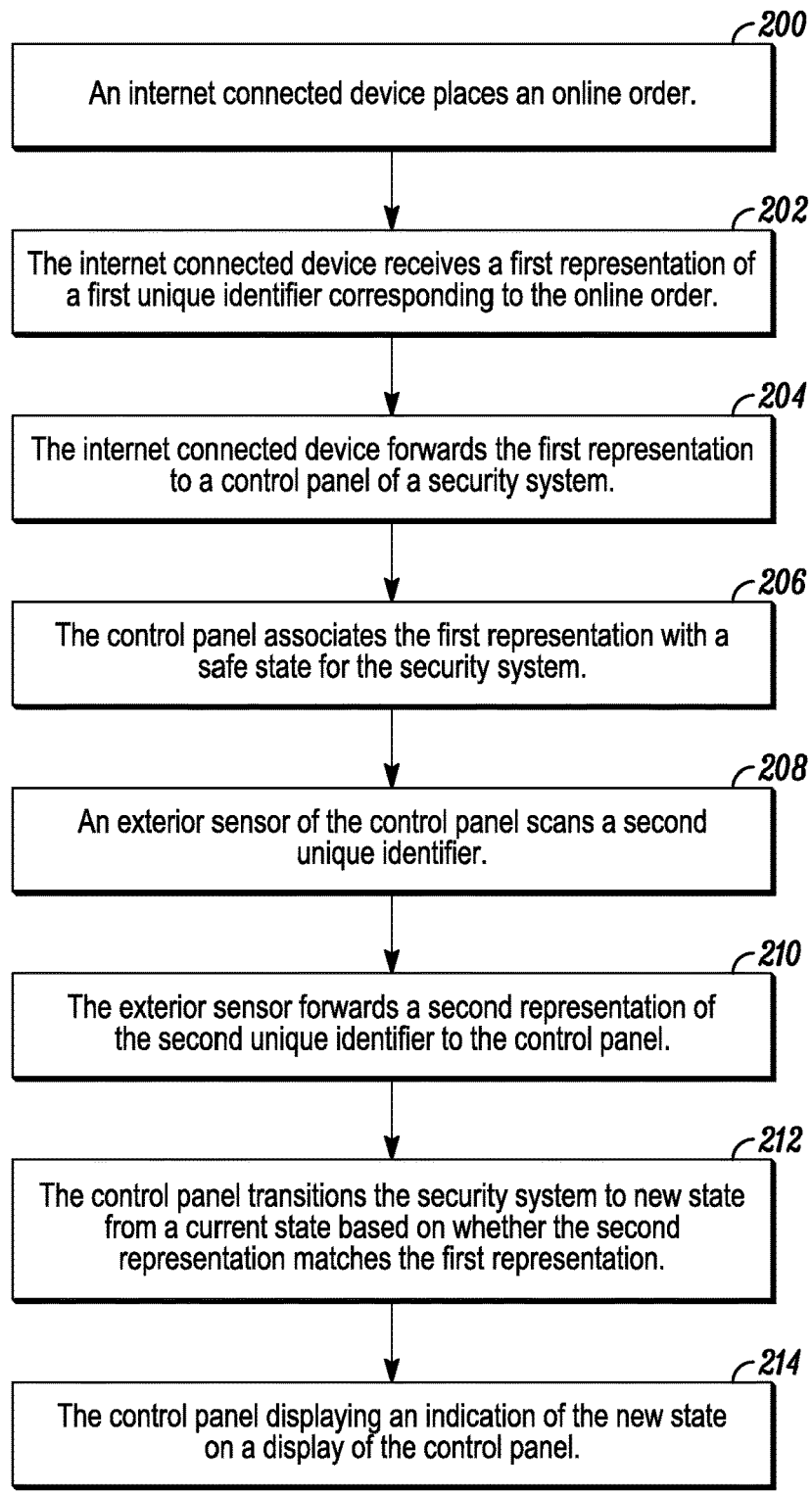
FIG. 3 is a flow diagram of a method in accordance with disclosed embodiments.

FIG. 3 is a flow diagram of a method in accordance with disclosed embodiments. As seen, an internet connected device can place an online order as in 200. The internet connected device can receive a first representation of a first unique identifier corresponding to the online order as in 202. The internet connected device can forward the first representation to a control panel of a security system as in 204. The control panel can associate the first representation with a safe state of the security system as in 206. An exterior sensor of the control panel can scan a second unique identifier as in 208. The exterior sensor can forward a second representation of the second unique identifier to the control panel as in 210. The control panel can transition the security system from a current state to a new state based on whether the second representation matches the first representation as in 212. The control panel can display an indication of the new state on a display device of the control panel as in 214.

Although a few embodiments have been described in detail above, other modifications are possible. For example, the method steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    an internet connected device placing an online shopping order;
    the internet connected device receiving a first representation of a first unique identifier corresponding to the online shopping order;
    the internet connected device forwarding the first representation to a control panel of a security system;
    an exterior sensor of the security system coupled to the control panel scanning a second unique identifier;
    the exterior sensor forwarding a second representation of the second unique identifier to the control panel;
    the control panel comparing the second representation to the first representation;
    the control panel displaying a recognition symbol on a display device of the control panel when the second representation matches the first representation; and
    the control panel initiating an alarm condition for the security system when the second representation fails to match the first representation.

2. The method of claim 1 further comprising the control panel storing the first representation in a memory of the control panel.

3. The method of claim 1 wherein the second unique identifier is displayed on a package delivered to a region monitored by the security system.

4. The method of claim 1 wherein the first unique identifier includes a first quick response code and the second unique identifier includes a second quick response code.

5. The method of claim 1 wherein the first unique identifier includes a first bar code and the second unique identifier includes a second bar code.

6. The method of claim 1 wherein the exterior sensor is coupled to an intercom device of the security system.

7. A method comprising:
an internet connected device placing an online order requiring delivery;
the internet connected device receiving a first representation of a first unique identifier corresponding to the online order;
the internet connected device forwarding the first representation to a control panel of a security system;
the control panel associating the first representation with a safe state of the security system;
an exterior sensor of the control panel scanning a second unique identifier;
the exterior sensor forwarding a second representation of the second unique identifier to the control panel;
responsive to comparing the first representation and the second representation, the control panel transitioning the security system from a current state to a new state; and
the control panel displaying an indication of the new state on a display device of the control panel.

8. The method of claim 7 wherein the new state includes the safe state and the current state includes an armed state when the second representation matches the first representation.

9. The method of claim 7 wherein the new state includes the safe state and the current state includes a disarmed state when the second representation matches the first representation.

10. The method of claim 7 wherein the new state includes an armed state and the current state includes a disarmed state when the second representation fails to match the first representation.

11. The method of claim 7 wherein the new state includes an armed state and the current state includes the armed state when the second representation fails to match the first representation.

12. The method of claim 7 further comprising the control panel storing the first representation in a memory of the control panel.

13. The method of claim 7 wherein the second unique identifier is displayed on a package delivered to a region monitored by the security system.

14. The method of claim 7 wherein the first unique identifier includes a first quick response code and the second unique identifier includes a second quick response code.

15. The method of claim 7 wherein the first unique identifier includes a first bar code and the second unique identifier includes a second bar code.

16. A system comprising:
an internet connected device;
an exterior sensor; and
a control panel that includes a display device,
wherein the control panel is coupled to the internet connected device and the exterior sensor,
wherein the internet connected device places an online shopping order, receives a first representation of a first unique identifier corresponding to the online shopping order, and forwards the first representation to the control panel,
wherein the exterior sensor scans a second unique identifier and forwards a second representation of the second unique identifier to the control panel, and
wherein the control panel compares the second representation to the first representation, displays a recognition symbol on the display device when the second representation matches the first representation, and initiates an alarm condition for the security system when the second representation fails to match the first representation.

17. The system of claim 16 further comprising a memory of the control panel, wherein the control panel stores the first representation in the memory.

18. The system of claim 16 wherein the second unique identifier is displayed on a package delivered to a region monitored by the control panel.

19. The system of claim 16 wherein the first unique identifier includes a first quick response code and the second unique identifier includes a second quick response code.

20. The system of claim 16 wherein the first unique identifier includes a first bar code and the second unique identifier includes a second bar code.

* * * * *